(12) United States Patent
Slawson et al.

(10) Patent No.: US 9,880,712 B2
(45) Date of Patent: Jan. 30, 2018

(54) IN-APPLICATION CUSTOMIZATION

(71) Applicant: Microsoft Corporation, Redmond, WA (US)

(72) Inventors: Dean A. Slawson, Sammamish, WA (US); Doron Bar-Caspi, Redmond, WA (US); Gregory S. Lindhorst, Seattle, WA (US); Imran Aziz, Seattle, WA (US); Nichol C. Viton, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 465 days.

(21) Appl. No.: 14/320,457

(22) Filed: Jun. 30, 2014

(65) Prior Publication Data
US 2015/0074546 A1 Mar. 12, 2015

Related U.S. Application Data

(60) Provisional application No. 61/874,677, filed on Sep. 6, 2013.

(51) Int. Cl.
*G06F 3/14* (2006.01)
*G06F 3/0484* (2013.01)
*G06F 9/445* (2006.01)
*G06F 3/048* (2013.01)

(52) U.S. Cl.
CPC .......... *G06F 3/0484* (2013.01); *G06F 3/048* (2013.01); *G06F 8/65* (2013.01)

(58) Field of Classification Search
CPC ..................................... G06F 3/14; G06F 3/17

USPC .......... 715/747, 866; 717/106, 123; 348/552
See application file for complete search history.

(56) References Cited

U.S. PATENT DOCUMENTS

| | | |
|---|---|---|
| 2010/0174974 A1 | 7/2010 | Brisebois et al. |
| 2010/0194980 A1* | 8/2010 | Balasubramanian H04N 5/4401 348/552 |
| 2010/0281475 A1 | 11/2010 | Jain et al. |
| 2012/0117534 A1 | 5/2012 | Hershenson et al. |
| 2012/0260232 A1 | 10/2012 | Hirsch et al. |
| 2013/0117719 A1* | 5/2013 | Bender ................ G06F 9/4443 715/866 |
| 2013/0159892 A1 | 6/2013 | Suraj et al. |
| 2013/0305218 A1* | 11/2013 | Hirsch ..................... G06F 8/36 717/106 |

(Continued)

OTHER PUBLICATIONS

"International Search Report & Written Opinion Received for PCT Application No. PCT/US2014/053770", dated Nov. 3, 2014, 13 Pages.

(Continued)

*Primary Examiner* — Ruay Ho
(74) *Attorney, Agent, or Firm* — Talem IP Law, LLP

(57) ABSTRACT

In-application customization is provided where users can both use and customize the application. Within a graphical user interface of an application developed by an original author, an interaction from a customizer user of the application can be received to make a modification to the application from a set of available modifications that the original author did not create for the application. The modification can be performed using functionality made available through a developer program service.

20 Claims, 10 Drawing Sheets

(56) References Cited

U.S. PATENT DOCUMENTS

2014/0173563 A1* 6/2014 Dias .................. G06F 8/74 717/123

OTHER PUBLICATIONS

Marmel, Elaine, "Download Apps from the Office Store", In Book: Teach Yourself Visually Office 2013, Mar. 18, 2013, 8 Pages.

O'Brien, et al., "Maven Integration for Eclipse, Developing with Eclipse and Maven", Published on: May 1, 2011, Available at: http://books.sonatype.com/m2eclipse-book/pdf/m2ebook-pdf.pdf.

"Second Written Opinion Issued in PCT Application No. PCT/US2014/053770", dated Mar. 30, 2015, 9 Pages.

"International Preliminary Report on Patentability Issued in PCT Application No. PCT/US2014/053770", dated Jun. 25, 2015, 9 Pages.

Liu, et al., "Towards Service Composition Based on Mashup", In Proceedings of IEEE Congree on Services, Jul. 9, 2007, 8 pages.

"Customize for Every User—Fast", Retrieved on: Nov. 22, 2013, Available at: http://www.salesforce.com/mobile/customize/features/?d=70130000000tdW2&internal=true.

"Fully-Customizable Mobile Apps", Retrieved on: Nov. 22, 2013, Available at: https://www.snappii.com/why-snappii/fully-customizable-mobile-apps.

Wasilewska, et al., "Template Mobile Applications for Social and Educational Development", In Proceedings of International Multiconference on Computer Science and Information Technology, Oct. 12, 2009, 8 pages.

"Create custom apps fast without being a developer". Retrieved on: May 30, 2014, 2 pages, Available at: http://office.microsoft.com/en-us/access.

"Office Action Issued in European Patent Application No. 14771667.4", dated Dec. 8, 2016, 10 Pages.

"FSEDIT Procedure Windows Overview", Retrieved from <<http://www.okstate.edu/sas/v8/saspdf/fsproc/0921c04.pdf>>, Oct. 1, 1999, 41 Pages.

"Office Action Issued in European Application No. 14771667.4", dated Feb. 6, 2017, 10 Pages.

* cited by examiner

IN-APPLICATION CUSTOMIZATION

CROSS-REFERENCE TO RELATED APPLICATION

This application claims the benefit of U.S. Provisional Application Ser. No. 61/874,677, filed Sep. 6, 2013.

BACKGROUND

Software applications are popular for providing entertainment, assisting users in performing tasks, and in performing a variety of tasks. Some applications may contain vast amounts of functionality such as is available through Office Suites such as Microsoft® Office and Office365™, Apache OpenOffice™, Zoho® Office Suite, Apple iWork®, Google Drive™, Facebook®, Adobe Photoshop®, and even Amazon Kindle® reader. Other applications provide specific, or limited, functionality for handling certain tasks, for example Facebook Messenger that is directed to the messaging component of Facebook and a weather application such as provided by Accuweather, Inc. These more limited function applications (and even the full featured applications) are commonly used on mobile devices. Applications for mobile devices (including phones, tablets, phablets, laptops, and wearables), as well as applications for desktop devices (including Mac and PC) are often referred to as "apps".

To purchase an application, it is common for people to use their mobile phone, tablet or other computing device to search in an "app store" for a desired application, such as a game, media application, productivity application or the like, which can then be downloaded and installed, or delivered as a web application, and run on their mobile phone, tablet or other computing device with ease. An app store refers to a distribution platform for applications. Examples of app stores include Amazon® Appstore, Google Play™, Apple® App Store, Windows® Phone Store, and Microsoft® Office Store.

BRIEF SUMMARY

Techniques and systems for in-application customization are described.

Certain methods of creating an application are described where, in an application developed by an original author, an interaction with the application can be received to make a modification to the application from a set of available modifications that the original author did not create for the application. The application by the original author may be downloaded from an app store or received from the original author in another manner. The modifications can be available through communication with a developer platform service and, in some cases, involve the inclusion of functionality obtained through a function store or app store.

A first user interface can be provided for an application having the in-application customization capabilities, through which a user can use the application and a second user interface can be provided for the application upon entering a customization mode through which the user can modify the application beyond that made available by the original developer of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques and systems for in-application customization are described where, while a user is within an application, it is possible for that user to customize the application beyond that made available by the original developer of the application. The application can be used as originally developed or as specifically customized by the user.

In an app store, the available apps are based on what developers have created (and made available through the particular distribution platform). If a user wants a particular function, they must look through the available apps for one that may be able to perform that function. Often an app has almost everything the user could want to perform that particular function. When there are features or functionality that the user would like to see included, the user may either place a request to the developer that the feature be added to a next version of the app or search for another app that can address their needs. The subject techniques and services enable the user to modify the app so that the app includes the features the user desires without needing to know how to code or develop an application. Thus, when there are other things that the user would like to see in the app (and the user does not want to build their own app), the user is not limited to resolving those issues by submitting a request to the developer and/or search for another app that could meet those needs.

In-application customization enables users to modify the app they downloaded from the app store in ways beyond the settings options hard-coded in the application. For example, an end user of the app may be able to adjust the layout, change a background image, add fields to the data schema, specify logic (such as validation rules or a work flow including associated system behaviors), and in some cases adjust certain functionality and add features—all without needing to know how to program.

Customizable apps (in-application customization applications) can be made available for user devices including smartphones, tablets (including Apple iPad® and Microsoft Surface®), and wearable computers. Other form factor devices and appliances of varying capabilities may also use in-application customizable apps. A customizable app is an application for user devices that enable a user to alter, edit, and otherwise tweak elements of the application so that the user can modify the application to better meet the user's needs and interests.

Figure 1A:
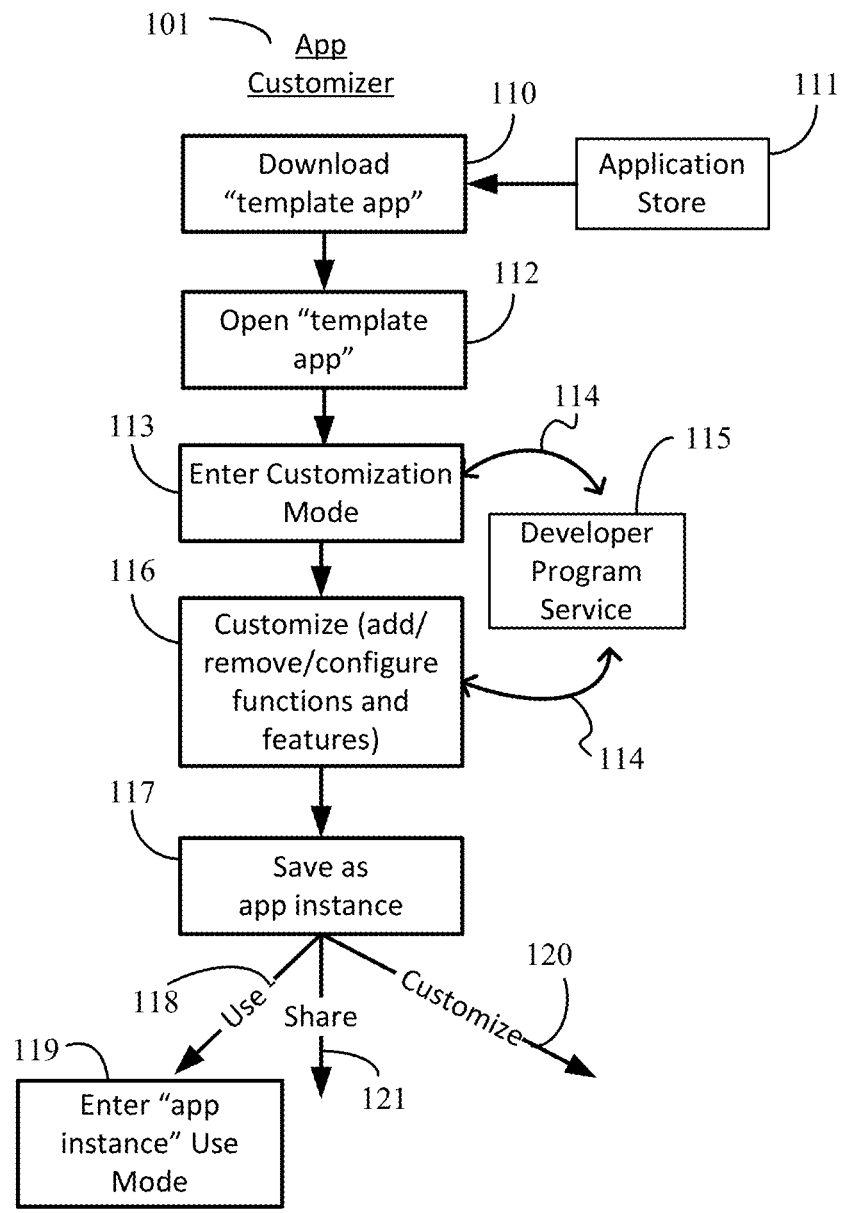
FIGS. 1A-1C illustrate example in-application customization application scenarios.
Figure 1B:
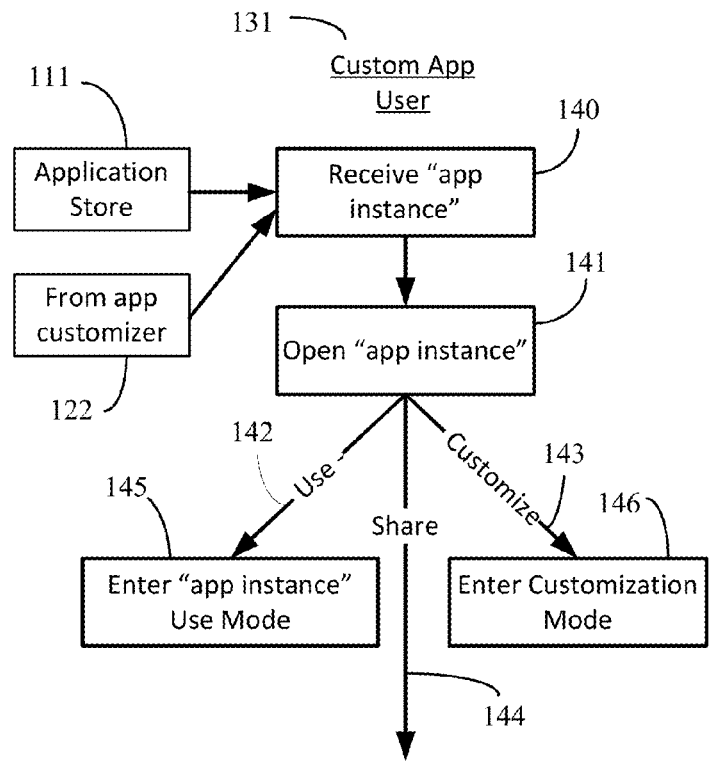
Figure 1C:
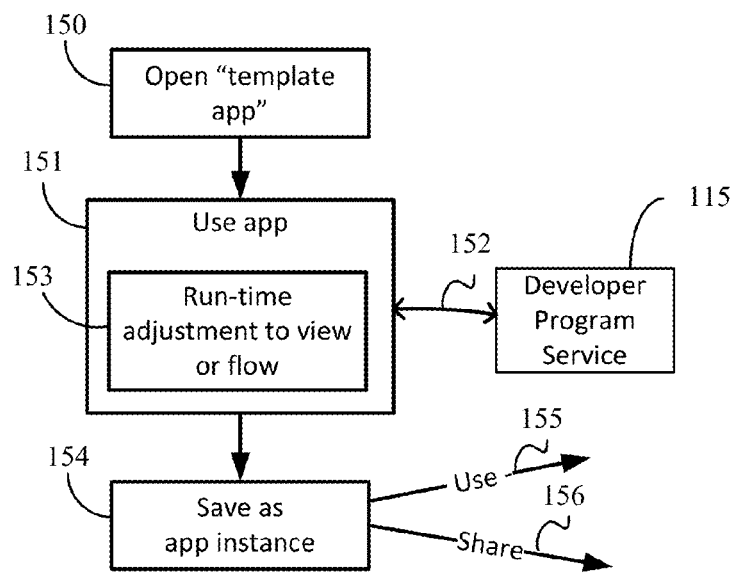

FIGS. 1A-1C illustrate example in-application customization application scenarios. In one scenario, as illustrated in FIG. 1A, an application, or "app", customizer 101 may download a "template app" (110), for example from an application store 111. The template app is one example of an in-application customizable application and may include forms and fields that begin as blanks (e.g., because the template app instantiates a blank database) and are filled in by the app customizer when initially launched.

An application template may contain all of the functions or features that a user may want to consume or may contain themes or other aspects that the user finds pleasing or useful. The variety and complexity of application templates can be provided in a similar variety and manner as templates for creating a presentation in a presentation application such as Microsoft® PowerPoint® or templates for a calendar, birthday card, or memo document in a word processing application such as Microsoft® Word®.

For example, the app customizer 101 may open the template app (112) and enter customization mode (113), which enables the template app to access and provide customization ability through a developer program service 115. The template app can, through communicating (114) with the developer program service 115, enable the app customizer to customize the app while within the app itself (116). In some cases, the template app may appear as a complete and ready-to-use app. In other cases, the template app may be completely or partially blank. A template app or a generic app may be customized and a customized app may be further customized or made more generic.

An application template can include views (user interface screens) that enable customizations. One view can include a "home page" or settings view (e.g., such as settings view 220) that enables access to and/or control of aspects including, but not limited to, global application settings, titles, theme, management of user permissions, adding/removing application functions and features, and managing sample data.

The app customizer 101 may be able to perform customizations without a programming background or platform to suit their individual or organizational needs. The customizations to the template app can include, but are not limited to, showing or hiding fields or tables, adding entirely new fields or tables, in some cases removing fields or tables, and personalizing the app name, background, or themes. The app customizer 101 may add and configure application functions/features and may even be able to manage permissions for app users. For example, an app customizer 101 may have purchased a wedding planning app. The app customizer 101 may decide that they want to have t-shirts for the wedding guests and that they would like to incorporate the ability to coordinate and order the t-shirts as part of the wedding planning app. The app customizer 101 may then, while in customize mode, add a field for t-shirt size along with the RSVP field—even if the RSVP field originally only indicated number of attendees, name, and food selection.

An app customizer 101 can customize an application by interacting with the application itself. The customizations can be specific modifications to the application. The modifications can be from a set of available modifications that include features that the original developer of the template app enabled to be free for modification (or did not disable access to the services described herein) as well as, in some cases, modifications extensible through communication with a function store or app store.

The customized app can be saved as an app instance (117), which may take the place of the template app or, in some cases, be saved separate from the template app. The app can be modified for all instances of the app or just for a personalized instance.

The app customizer 101 can use the app instance (118), for example by selecting and entering an "app instance" use mode (119) from the customization mode (or as a default mode upon a subsequent launch of the app instance). The app customizer 101 can also perform further customizations (120) and updates. This may be accomplished by the user selecting to return to a customization mode featuring functionality such as described with respect to operations 113 and 116, followed by saving the particular app instance as in operation 117.

The app customizer owns their instance of the app and can share their customized app with others (121). In some cases, the app customizer may be able to make their customized app available via the application store 111. In some cases, the app customizer may share their customized app to a custom app user through a shared app link via email or some other manner. For example, as shown in FIG. 1B, the app instance may be available in the application store 111 or provided (or made available) in some manner from the app customizer (122) so that a custom app user 131 may receive the app instance (140). A custom app user 131 may be a consumer of an instantiated app who can navigate through the application (such as after getting a simple tutorial), can import or enter data into the application (as enabled by the app customizer), and may even share an app instance with friends, family, co-workers and the like.

For example, after the custom app user 131 receives the app instance (e.g., via download or other access), the custom app user 131 can open the app instance 141 and use (142), customize (143), or share (144) the app instance in a similar manner as the previous app customizer 101. In the use scenario, the custom app user 131 can enter the app instance use mode (145) by default or upon selection (which can be similar to that described with respect to operation 119). In the customization scenario, the custom app user 131 can enter the customization mode (146) such as described with respect to operations 113, 116, and 117.

In addition to (or as an alternative to) enabling customizations during a specific customization "mode" (e.g., as shown in FIGS. 1A and 1B), certain customizations can be carried out at run-time. For example a slider may be changed at runtime that results in modifying a view or a user flow through a process. This change at run-time can be persisted in the app or in an app template so other users may benefit from the change in view or flow.

One scenario of run-time customization is illustrated in FIG. 1C. Referring to FIG. 1C, the app customizer 101 or custom app user 131 may open the template app (150) and begin using the app (151). In some cases, the app customizer 101 or custom app user 131 may have customized the app through a customization mode. In some cases, no distinct customization mode occurs; rather, changes to the app may be carried out during run-time. The app, while in use, may continuously or at particular times (in response to a command, programmatically or automatically) have communication (152) with the developer program service 115.

The app can, through communicating (152) with the developer program service 115, enable the app customizer to customize the app while within the app itself as a run-time adjustment (153). When a user makes a run-time adjustment to the view or flow of the app (153), the change can be made possible through the communication between the app and the developer program service 115. The customized app can be saved as an app instance (154), which may take the place of the app or, in some cases, be saved separate from the app. The app can be modified for all instances of the app or just for a personalized instance. In some cases, communication is made between the app and the service 115 upon an indication that the change is to be persisted. For example, an indication may be made at the time of making the change, at the command of the user, or upon exiting the app. Once the app instance is saved (154), the user may use (and edit) the app instance (155) or share the app instance (156). In some cases, the app customizer may be able to make their customized app available via the application store 111. In some cases, the app customizer may share their customized app to a custom app user through a shared app link via email or some other manner.

Figure 2A:
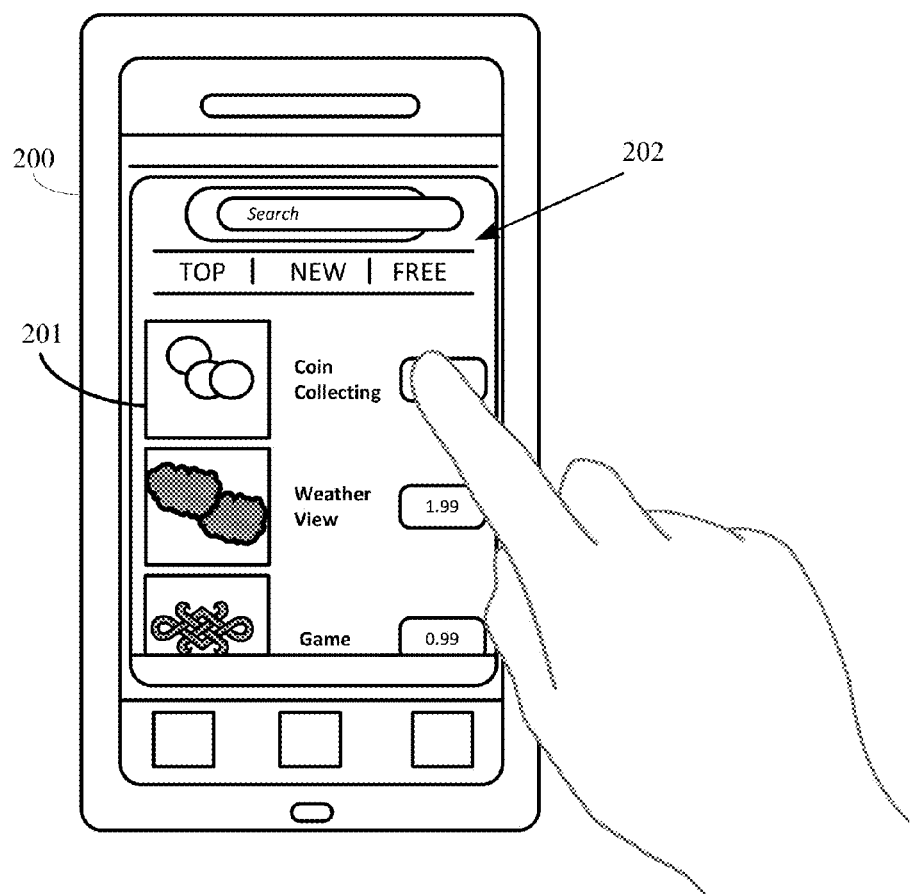
FIGS. 2A-2I illustrate graphical user interfaces for describing various scenarios for in-application customization applications.

FIGS. 2A-2I illustrate graphical user interfaces for describing various scenarios for in-application customization applications. FIG. 2A illustrates the purchase of an in-application customization application from an app store. In the illustrated example, the user, via a touch display of a smartphone computing device 200, selects a coin collecting application 201 from an app store interface 202 while on their smartphone device 200. The coin collecting application 201 may be indicated as an application template or appear as a regular application. The coin collecting application 201 can be presented along with other games, productivity, and creativity applications that can be purchased (for free or paid).

Figure 2B:
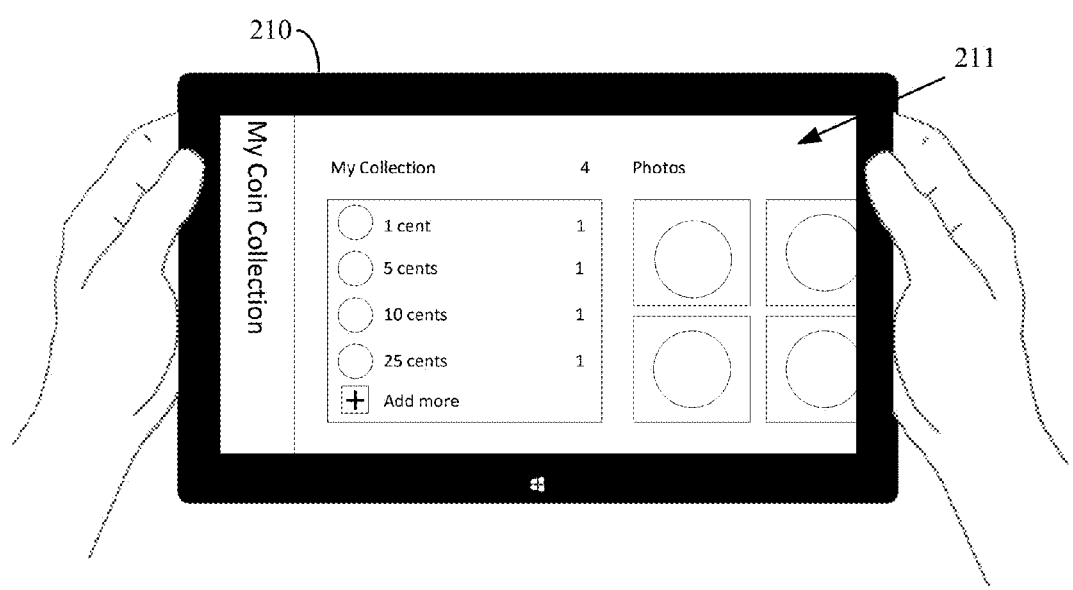
Figure 2C:
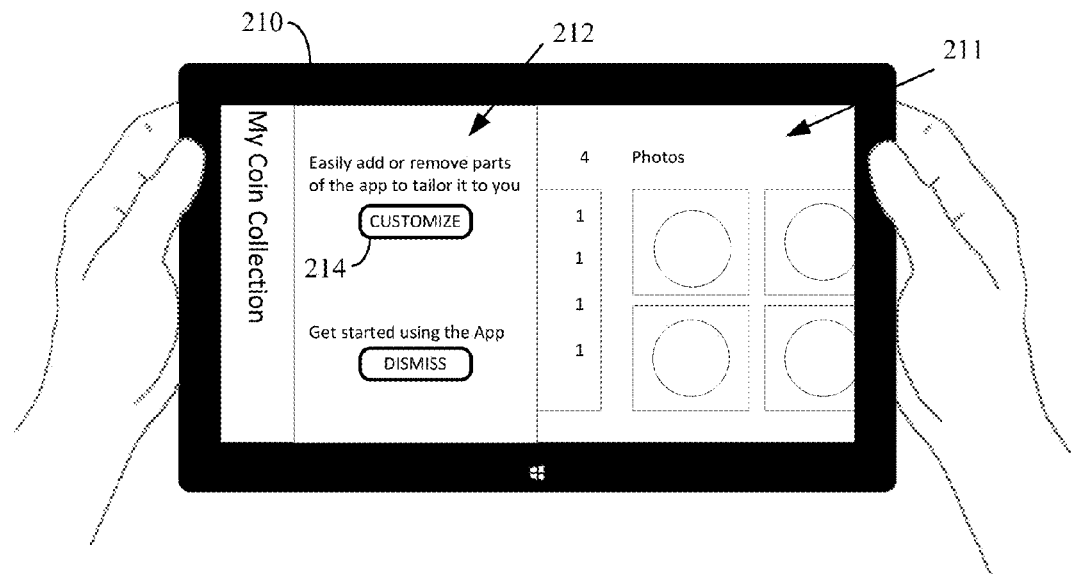

The user may access the coin collecting application 201 from the device from which the user purchased the application or, where the purchase of the coin collecting application 201 is tied to a user account instead of a specific device, the user may access the coin collecting application 201 from any device associated with the account (or from which the user may log-in to the account). For example, the user may launch the coin collecting application 201 on a tablet computing device 210. FIG. 2B shows an application template example initial view 211 for the coin collecting application 20 and FIG. 2C shows the example initial view 211 that includes in an instructional window/pane 212, communicating to the user how to navigate, use or modify the app, which may optionally be provided the first time the application is launched (and in subsequent launches depending on user settings). The instructional window/pane 212 can include text, images, command elements, one or more videos, and even audio elements. The initial view 211 may represent an initial launch or home page of the application 201.

Through using in-application customization functionality, the coin collecting application 201 may be used to help manage a coin collection that a user keeps as a hobby or, through making some adjustments to the app, the app may be used to track any sort of information or data that is meaningful to the user on any device that can run apps. For example, the coin collecting application 201 might be customized to manage the activities and roster of a team or club, manage an event like a conference or a wedding, or record and share information about some other type of collection. No specific programming skills are required to create such an application. Instead, once an app has been downloaded or otherwise added to a user's account, the app can be customized. Using the functionality available in an application's customization mode, it is possible to make a number of changes to any existing app or template.

Figure 2D:
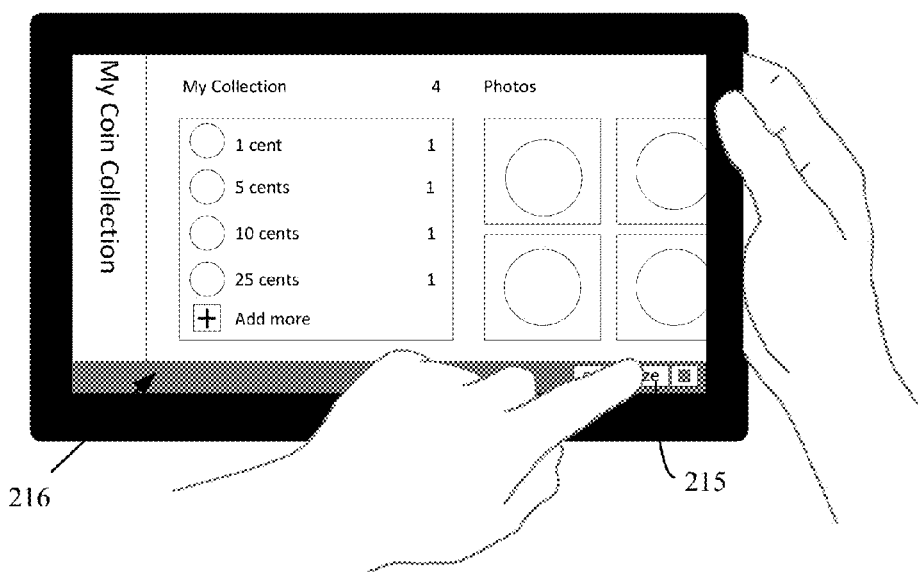

As illustrated in FIGS. 2C and 2D, a user may select to begin customizing. For example, in FIG. 2C, the instructional window/pane 212 includes a customize command element 214 that the user may click on or otherwise interact with (via touch, gesture, and the like). In some cases, a verbal command may be used. FIG. 2D illustrates an example entry point when there is no instructional window/pane 212 or default menu being displayed. The customize command element 215 in FIG. 2D may be available from a panel 216 that emerges upon performing a swipe or touch gesture when the user is in the application (and not necessarily limited to the initial view 211). In response to receiving the command to customize (e.g., via command element 214 or 215), the coin collecting application 201 can enter customization mode.

In some cases, the entry into customization mode may be based on a particular action as opposed to a graphical user interface command element. For example, a touch and hold gesture may signal to the application that the user wants to enter customization mode and, in response to a long enough hold, modifiable aspects may be presented to the user. As another example, customization mode can be in response to a voice command.

Figures 2E, 2F:
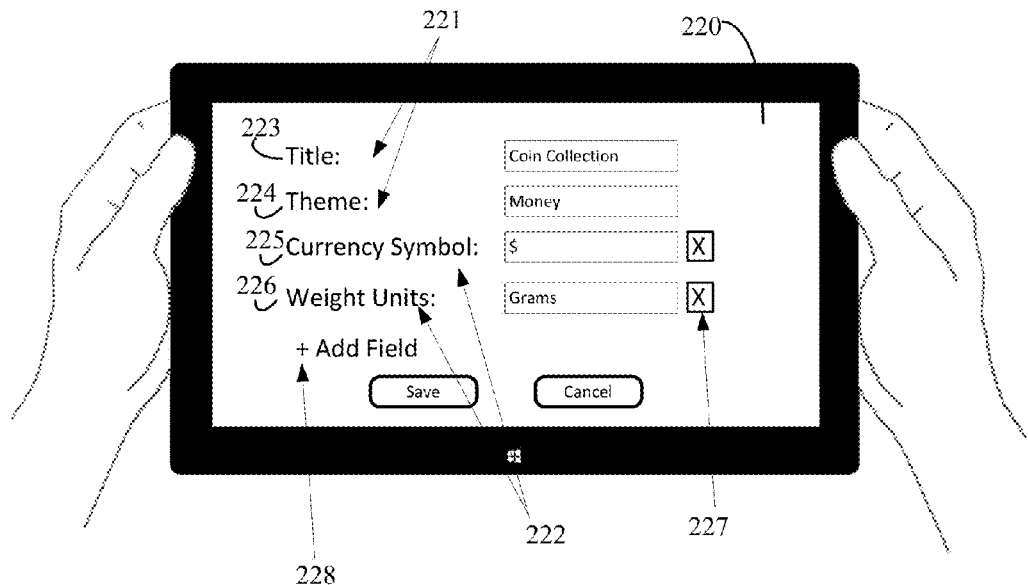

From the entry into the customization mode of the application, there are various manners in which the application may be interacted with for customizing. In some cases, specific graphical user interfaces may be presented. In some cases, an audio interface may be provided. FIGS. 2E and 2F illustrate two examples of graphical user interfaces for the customization mode. It should be understood that these examples are merely intended for illustration and should not be construed as limiting the manner that the customization interfaces may be presented.

Referring to FIG. 2E, a settings interface 220 may be presented so that a user may adjust certain fields that can be made available to the user. Various aspects of the app may be modified through the settings interface 220. Some of these aspects may be common to all apps (e.g., common fields 221), while others are specific to the particular template (e.g., app specific fields 222). In the example, app settings of title 223 and theme 224 may be provided as standard features in templates available for customization, whereas the settings of currency symbol 225 and weight units 226 can be specifically designated by the developer of the application template. In some cases, the app-specific fields may be removable (e.g., via a remove command element 227) and new fields may be added (e.g., via an add field command element 228). When a user changes the title of the app template, for example from the original "my coin collection" to "our coin collection," the title can be changed globally. Similarly, the user can change the other available settings through the settings interface 220.

FIG. 2F illustrates another approach that may be used as an alternative or in addition to the settings interface 220. In some cases, one example of which is illustrated in FIG. 2F, a customization mode may be specific to a particular subsection of the app, for example, a mode to customize a particular control or logic element. In the customization view 230 shown in FIG. 2F, each element that is editable can become "live" within the graphical user interface. In some cases, the elements, text and images can include indicia of being live, for example a highlighting, dotted box, or other indicator. In the example, the app title is indicated as being movable (231) and text-editable (232).

While within the customization view 230, a user may delete, and, and/or move sections of the app around (e.g., by clicking and dragging) to change its layout and look. In addition, it may be possible to change the sections of the app to contain different data fields, which could be used to help the user track and manage data or information relevant to the user's specific needs. For example, the coin types shown in the view may be changed to show the dates items were added to a collection (e.g., in selection 233).

Figure 2G:
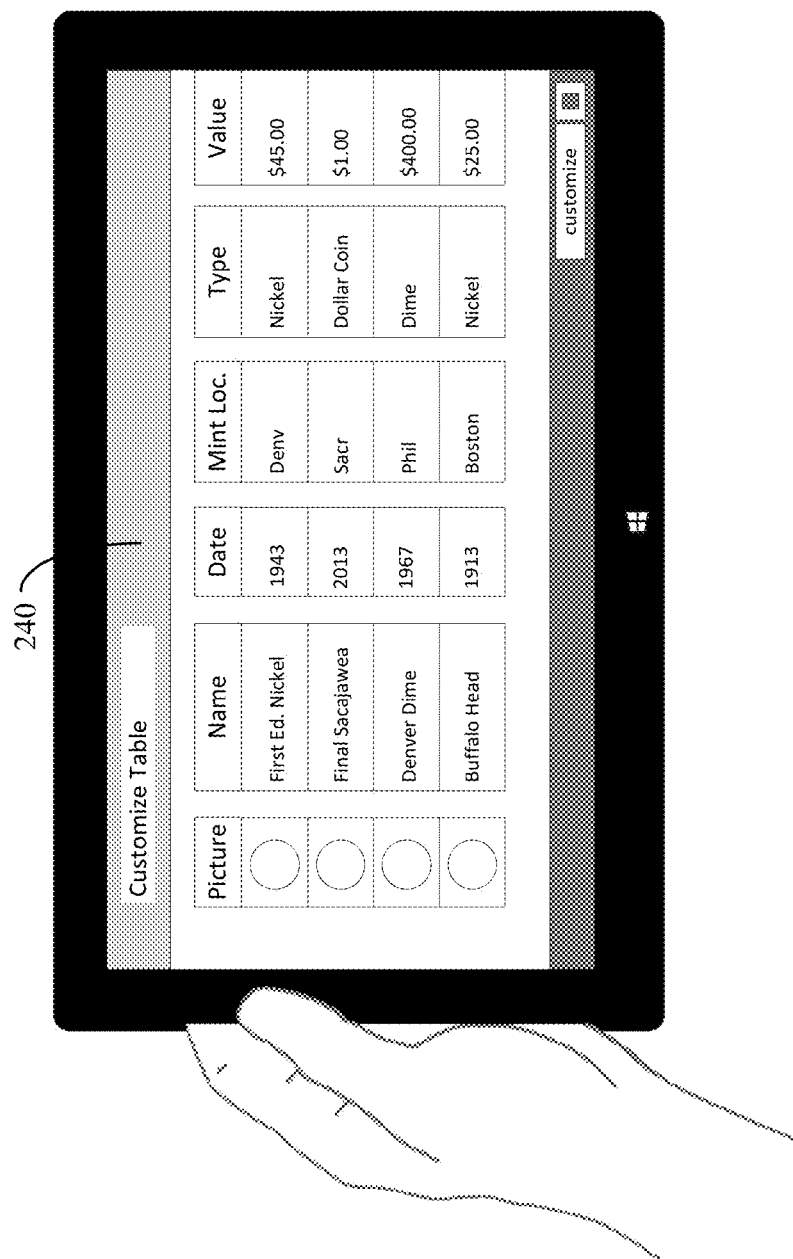

New views of the information can be created, along with the addition of further fields such as shown in FIG. 2G. Referring to FIG. 2G, the user may, through menu commands or dragging and rearranging fields, change the way the app looks and works, or example changing the view to look like a spread sheet (e.g., in table view 240). Other changes can involve adding or deleting columns, thereby changing what information the app can collect or display to users.

Figure 2H:
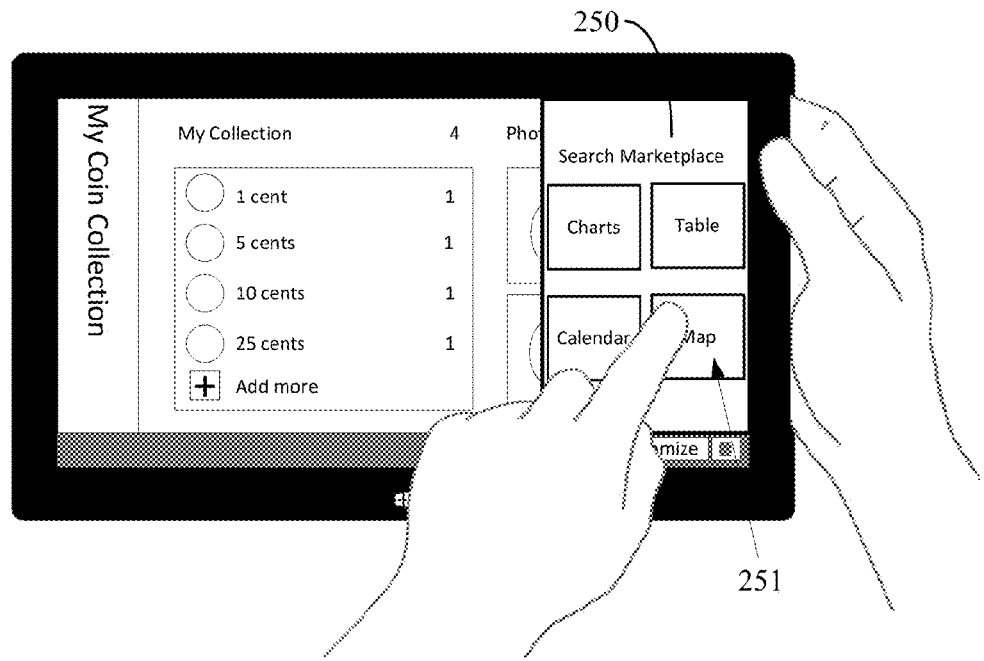
Figure 2I:
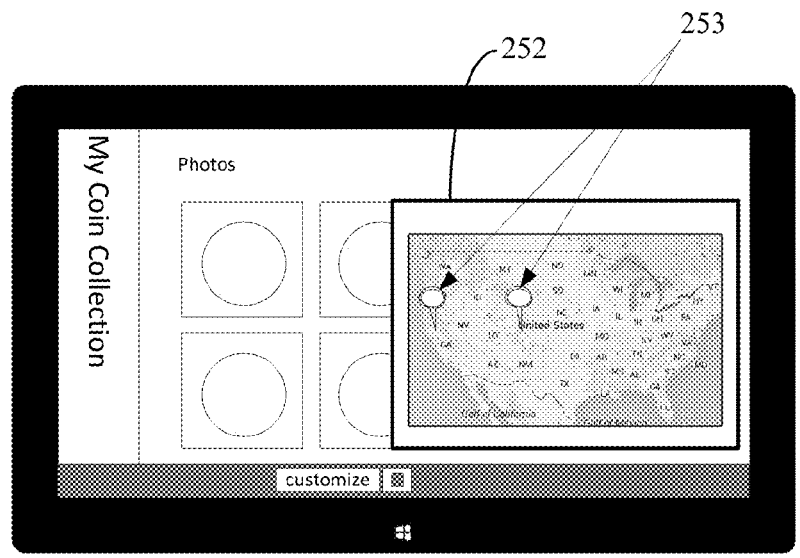

In some cases, such as shown in FIGS. 2H and 2I, new pieces of functionality can be added to customize the application. It is possible to search a marketplace, or "function store," to find different functions and/or features to add to the app, for example using a search marketplace pane 250. If the app did not originally include table functionality, the user may be able to search the marketplace for a table so that the table view 240 of FIG. 2G can be generated. For the example shown in FIGS. 2H and 2I, a map feature 251 is added so that the user can show in the app where the coins were minted. Once the map function is brought in to the application, the map's settings can be edited so the map 252 uses the correct data and displays the relevant US mint locations (e.g., via pins 253). One example of features that can be accessed through such a marketplace include apps based on Microsoft Office web extension functionality (e.g., apps for Office).

Other example functions that can be added include, but are not limited to adding charts/graphs, stock tickers, calendars, and content from other sites. Specific modifications that may be implemented to customize a variety of apps include, but are not limited to, renaming an app and changing its title, adding a custom background photo to personalize the app, changing the app's layout by moving, showing, or hiding fields of a view, creating entirely new views, and changing the app's functionality by adding or deleting fields or tables, customizing logic such as data validation or the steps, timing parameters or notification rules of a work flow process, and adding new functionality to the app such as charts, maps, and calendars.

Although numerous examples are presented for visual interfaces, embodiments are not limited thereto. For example, in some implementations for in-application customization, the application may be an audio application such as part of an interactive voice response (IVR) system. The IVR system application can include in-application customization where a user may program menus with touch tone or voice commands. In-application customization applications running on a video game console such as Microsoft Xbox®, Sony PlayStation® series or Nintendo Wii® may also be configured through voice commands.

Through in-application customization, it is also possible to adjust the application for a particular platform on which it may be run. The layout of an application may be tailored for a particular device/form factor. In addition, the customizer user can create application instances directed to a particular form or view or subset of functionality of the overall solution that is tailored to leverage the particular strengths or limitations of various devices.

The customizer user can target certain features for a particular platform or to take advantage of capabilities of the underlying device on which the application is to run. For example, the customizer user may add a feature that uses GPS data; the user can indicate that this feature is to be enabled when the application is running on a device that is GPS enabled. An example of a feature that uses GPS data is a location-based presentation of information, such as "nearby restaurants".

As another example, the customizer user may choose to customize the application to adapt features specifically for a large form factor device, which can display more detail and additional elements than a small form factor device. Similarly, touch-enabled features can be added for touch devices.

In a use case scenario, a customizer user may have purchased a recruiting application (with in-application customization capabilities) to use as a tool to help the user's company coordinate their recruiting. The user may decide to add a workflow for an approval process as part of the recruiting application. Since the approval process by this company includes parts of the process that are generally performed at various locations and with mobile recruiters and parts of the process that are performed by other people (or at a central location) and which may not be relevant to the mobile recruiters, the customizer user can configure instances of the application specific for these roles by simply customizing the purchased recruiting application.

Thus, the original recruiting application can include a set of applications with subsets of functionality for use. In some cases, the customizer user may turn off certain features of the application that are not relevant to the mobile recruiters and/or that are not designed to work well on the particular devices being used (e.g., an instance for a watch computing device, an instance for a desktop computing device, and an instance for a phone computing device may have varying levels of features and functionality controlled by the customizer user).

Figure 3:
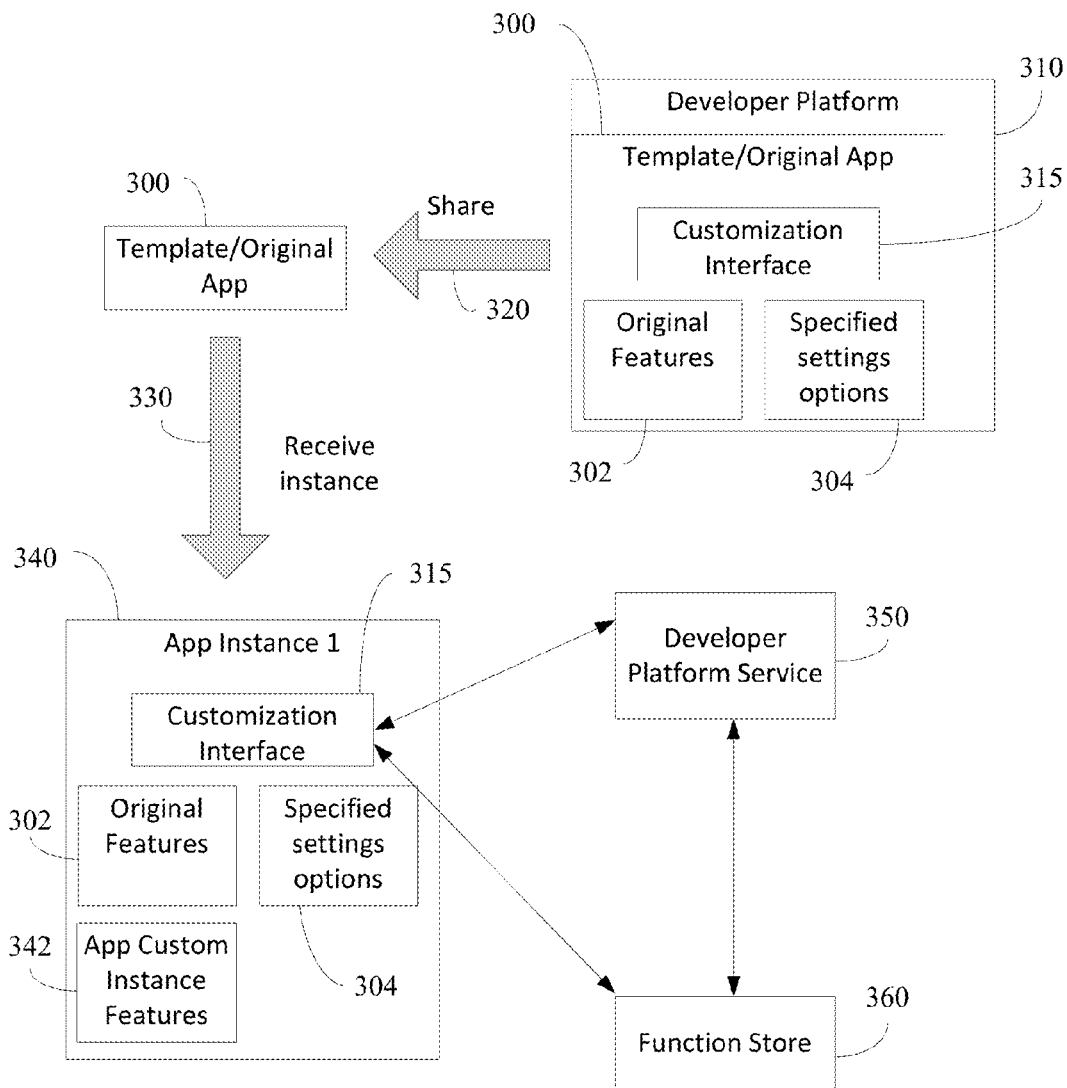
FIG. 3 illustrates a block diagram of an example implementation for in-application customization.

FIG. 3 illustrates a block diagram of an example implementation for in-application customization. Referring to FIG. 3, a template or original app 300 can be developed through a developer platform 110. The template/original app 300 can be created with original features 302 and specified settings options 304 for the original features that a user of the app can adjust.

In many applications, a user can modify certain settings, for example through an options menu as part of the specified settings options 304. These settings can sometimes adjust the way the application looks and even the information presented to the user. In-application customization can remove the limitations on the hard-coded adjustable settings currently available in many applications and enables a user to perform modifications to the application itself—as if the user was the developer of the application—but without requiring the user to be able to code or directly interact with a developer tool. In some cases, an application can include a settings menu and have a customization mode in which the user can customize the application and even determine the settings that users of the application can adjust.

Many apps are created using tools including integrated development environments (IDE) such as Xcode®, Eclipse®, Access®, and Visual Studio®. These IDEs are useful tools for developers, but can require a certain level of skill. Aspects of the current disclosure enable end users to avoid having to acquire a tool, learn, and understand how to develop an application. Through the services described herein, an app is customizable without the need to use a developer tool, creating an inherently customizable application in which modifications to the app are made while within the app. Thus, from an app developed by an original developer, the app can be customized by a user, now referred to as an author of a custom app (or customizer user). The custom app can also be customizable for a next user so that the next user can also become an author of his or her own custom app.

To facilitate this in-application customization, the original developer can create an application, such as template/original app 300, using a software development kit (SDK) (whether through an IDE or text editor). The SDK can include attributes for elements of the app. Various implementations of the in-application customization described herein expose those attributes of particular elements indicated by the developer as being permitted to be modified so that when a user of the app desires to modify an element, the attributes for that element are also modifiable. In some cases, a specific customization interface 315 can be generated by the developer platform 310 to provide an interface for accessing the functions of the developer platform 310 or another service that can facilitate the modifications to the application.

When an application is being developed in a development tool and assigned attributes having a declarative nature, those attributes can be changed during the development process. In the context of creating an application, for example through the developer tool, attributes are properties that associate metadata (also referred to as declarative information) with code (e.g., assemblies, types, methods, properties, and the like) Visual Basic and Visual C# are examples of development languages that include attributes.

Once an application such as template/original app 300 is finished being developed, the template/original app 300 can be shared (320) and made available to users as an in-application customization application (e.g., with a permission to customize). A user can receive an instance (330) of the template/original app 300 and use their instance 340 of the template/original app 300.

The user can customize their instance 340 of the template/original app by making one or more modifications from a set of available modifications. In some implementations, the in-application customization can be accomplished by end users by making available the capabilities of modifying attributes, as if the application was being modified within the development tool by an application developer. The customization interface 315 can facilitate the use of functionality from a developer platform service 350 (which may or may not be associated with the developer platform 310 used to develop the template/original app).

One example approach to providing this capability is through application programming interfaces (APIs) of a development tool that, when the application is in the customize mode, the application communicates with the development tool to provide the functionality to the user and the attributes of the elements in the application become modifiable. The application then calls the service to enable the customization. The service may be provided from a server (e.g., from the "cloud," an enterprise server, or another computing device with which the computing device running the application communicates). In some cases, the service may be provided from the same computing device as the computing device upon which the in-application customization application is running.

Although certain capabilities of a developer tool are made available to the application, the application is not opened in a developer tool while providing the in-application customization. In some cases, the underlying code and logic of the original application can be preserved. In some cases, the intellectual property (e.g., from the underlying code and logic) of the original developer can be preserved.

In addition to accessing a developer platform service 350, a function store 360 may be accessed (either directly by the app instance 340 or via the developer platform service 350) to enable the inclusion of features and functions from a function store.

In some embodiments, a developer tool is provided that exposes the functionality via, for example, a set of APIs that enable manipulation of the schema and layout of an application. A set of properties can be included for the app in the form of metadata for each app. These properties can include, but are not limited to, title, background, controls, form, font, and colors. Non-limiting examples of available API functions, which provide a set of modifications, can include change colors, add a control, move a control, add a new field, add layout hints for smart rendering, rearrange, change filters/sorts, hide fields/sections, change binding, append, hide, and in some cases, delete. In some cases, delete functionality can be minimized in the in-application customization applications to inhibit potentially destructive actions by users of the in-application customization application. For example, intrinsic app data can be prevented from being deleted or a "smart" delete can be provided that ensures that there are no dependencies on an element before the element is permanently removed.

In some cases, the app author (e.g., original developer or customizer user) can specify what is customizable, for example including some predefined patterns to prevent or encourage certain modifications. Permissions may also be controllable in-application and/or certain permissions established by the original developer.

In the modification experience, a user can add or remove features and move things around. In some cases, upgrading, or updating, the application can still be carried out so that updates provided by the original developer (or "author") of the application—or even updates provided by a previous customizer user of the application—can be available within the instance of the application as well as the customizations made by the user. For some cases for which updating is available, updates to the in-application customization application can be available to anyone who downloaded a particular instance of the app. The app may upgrade/update while maintaining each user's specific customizations by automatic or manual merging. If the user deviates too far from the original to have the new features from the upgrade applied, such information can be conveyed to the user. An upgrade refers to a new generation of the application where old functionality is mapped to new functionality and data can or cannot be preserved between the versions.

For example, if the functionality of the map was added and connected to certain data in an application, and the application was updated by an original author upgrade, a map can remain in the same place with the same data. This can be performed by the application even if the original author did not leave empty places for the user to add things. For example, a user may decide that certain addresses in a table should include maps. The map feature can be added to the first application and when it is upgraded, those changes are maintained. For example, the upgraded application can "revert" to the previously customized features.

Figure 4:
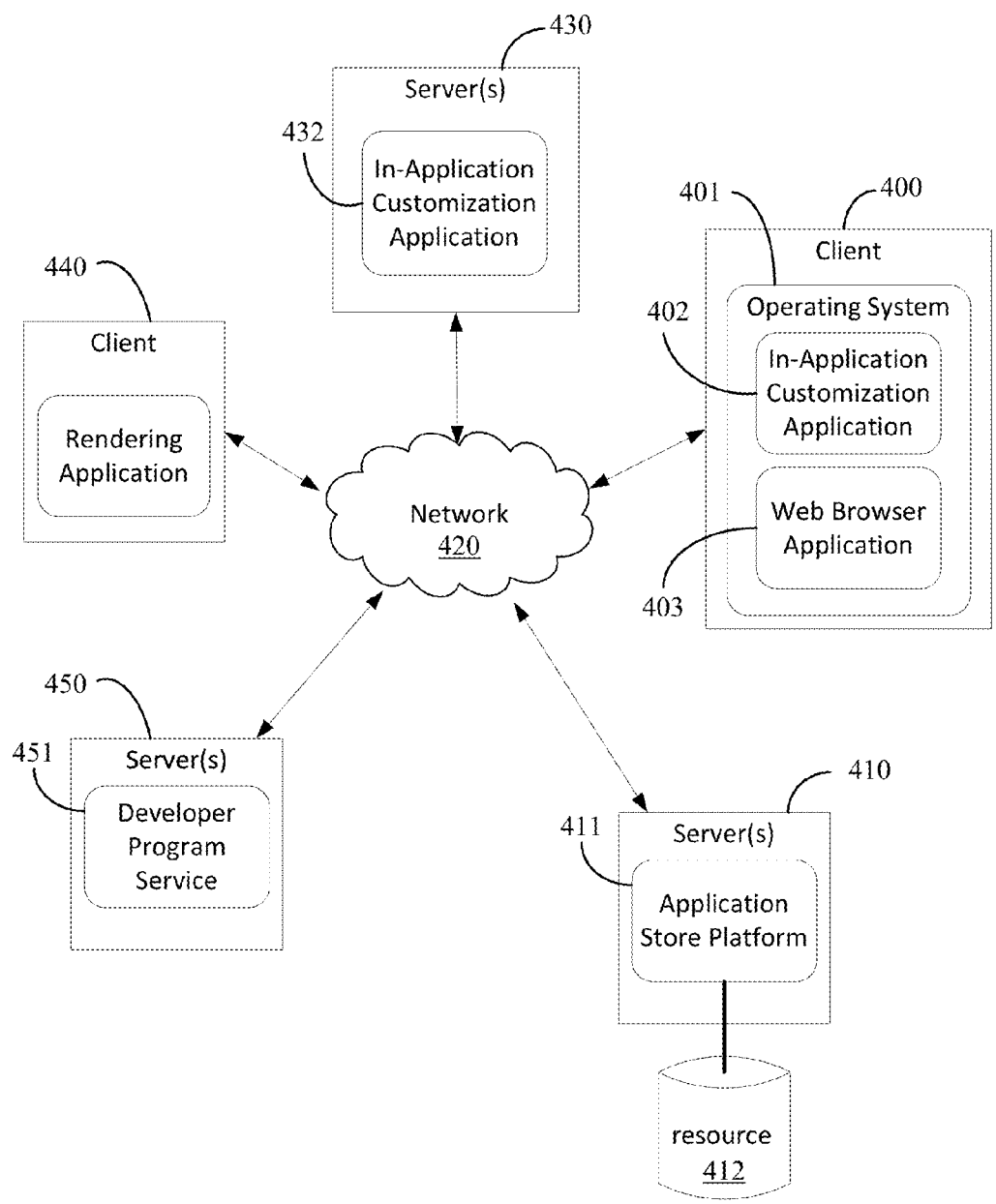
FIG. 4 illustrates an operational environment in which in-application customization of an application can be carried out.

FIG. 4 illustrates an operational environment in which in-application customization of an application can be carried out. In particular, once a template or application is created by a developer, the aspects available to the developer from within an IDE can be maintained, at least in part, by the template or application itself so that changes to the application can be made while within the application—and not as part of a programming environment.

Referring to FIG. 4, a client computing device 400, such as, but not limited to, a personal computer, desktop computer, terminal, laptop, tablet, personal digital assistant (PDA), mobile phone (or smart phone), refrigerator, global positioning system (GPS), game console, television, wearable computing device (e.g., watch-based, glasses-based), or large form factor device (e.g., Microsoft Perception Pixel (PPI) touch device), may be used to access an application store or "marketplace" server 410 (or servers) over a network 420 to download or otherwise purchase an in-application customization application. In some scenarios, a user may access (and even download) an in-application customization application directly from another user (e.g., via email or other electronic message) and/or computing device (e.g., server 430) over network 420.

The network 420 may be an internet, an intranet, an extranet, or combination thereof, and can be any suitable communications network including, but not limited to, a cellular (e.g., wireless phone) network, the Internet, a local area network (LAN), a wide area network (WAN), a WiFi network, an ad hoc network, or a combination thereof. Such networks may involve connections of network elements, such as hubs, bridges, routers, switches, servers, and gateways.

The network 420 may include one or more connected networks (e.g., a multi-network environment) including public networks, such as the Internet, and/or private networks such as a secure enterprise private network. Access to the network 420 may be provided via one or more wired or wireless access networks (not shown), as will be understood by those skilled in the art. As will also be appreciated by those skilled in the art, communication networks can take several different forms and can use several different communication protocols.

In general, the client computing device 400 may execute an operating system 401 and one or more application programs such as, in the illustrated embodiment, an in-application customizable application 402 and/or a web browser application 403. The operating system 401 is a computer program for controlling the operation of the client computing device 400. The in-application customizable application 402 may be any executable program having the functionality described herein for at least one of the various implementations.

The web browser application 403 is an application program for retrieving and traversing information resources on the World Wide Web ("the Web"), as well as resources provided by web servers in private networks via the network 420, and presenting the information resources to a user (e.g., rendering for display). Moreover, the web browser application 401 allows a user to access information and various functions provided by a server. In some cases, the web browser application 403 can be used as a portal to access the application store platform 411 executed by server(s) 410 (and that communicates with a resource 412 storing the applications (or the addresses of the applications) available through the application store platform 411).

The web browser application 403 can also be used as a portal to a server (or servers), for example server computer 430, on which an in-application customization application is executed as a web application. Server computer 430 may be embodied with aspects described with respect to system 550 of FIG. 5B. The illustrated server computer 430 is configured to execute one or more application programs such as in-application customization application 432, and/or one or more other applications.

Figure 5A:
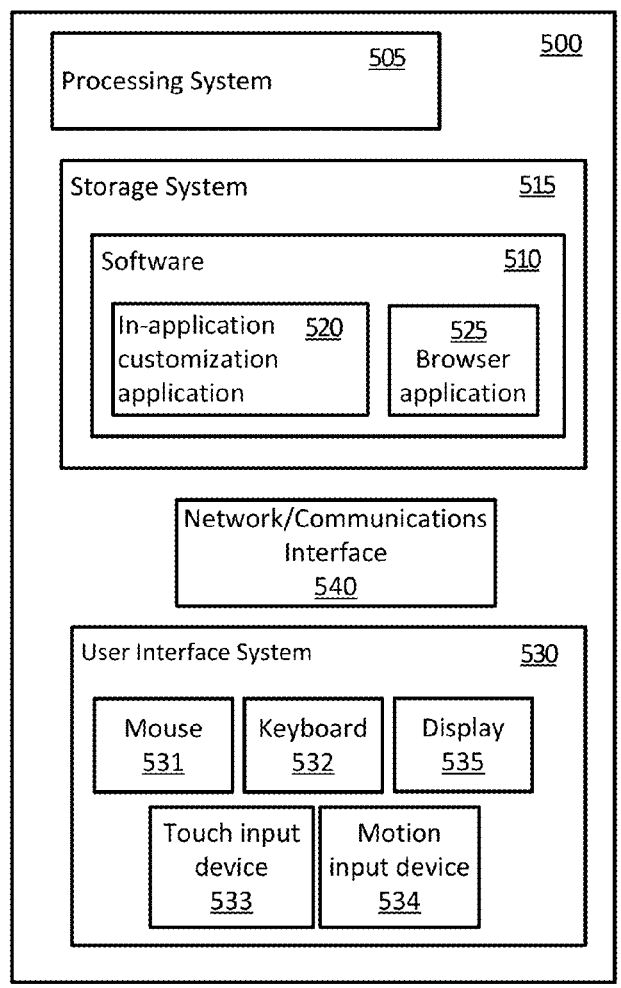
FIGS. 5A and 5B present block diagrams illustrating components of systems that may be used to implement the techniques described herein.

Client computing device 400 may be embodied with aspects described with respect to system 500 of FIG. 5A.

In one operational scenario illustrated in FIG. 4, the in-application customizable application can involve a cloud-based application (e.g., the in-application customization application 432) accessed using a "thin" client 440.

A thin client refers to a computing device and/or a computer program that relies on another computing device, often one or more servers, to perform computational and other programmatic roles. In some cases, a thin client involves a graphical user interface through which a user interacts with the computer program operating at a server (or servers). Sometimes a web browser is available at the thin client to provide the portal to the computer program operating at the server (or servers). In some cases, it is only the software application of the in-application customizable application that is the "thin client" as the computing device on which the thin client is being operated may be able to perform computational and other programmatic roles for other software applications.

The original application definition and in-application customization definitions can be stored in the cloud (represented by server computer 430), and the thin client 440 enables the user to interface with the cloud-based application (e.g., the in-application customization application 432) through a rendering application 441, which may include a web browser application or a graphical user interface for the in-application customization application. Thin client 440 may alternatively or additionally include audio user interfaces (e.g., an audio interface to an in-application customization application that receives audio input and transmits audio output). Thin client 440 may be any suitable client computing device including those described with respect to client computing device 400. In some cases, client computing device 400 can operate as a thin client and/or include a client application that functions as a thin client.

In another operational scenario illustrated in FIG. 4, an in-application customization application 402, 432, may communicate over network 420 with one or more servers 450 providing a developer program service 451 to use the functionality available from the developer program service 451 to permit customizations from within the application 402, 432.

The various in-application customization applications and developer program services may communicate with each other using APIs to send requests and receive information.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

The API-calling component may be a local component (i.e., on the same data processing system as the API-implementing component) or a remote component (i.e., on a different data processing system from the API-implementing component) that communicates with the API-implementing component through the API over a network. An API is commonly implemented over the Internet such that it consists of a set of Hypertext Transfer Protocol (HTTP) request messages and a specified format or structure for response messages according to a REST (Representational state transfer) or SOAP (Simple Object Access Protocol) architecture.

It should be understood that an in-application customization application (such as 402, 432) can be an Internet app, a cloud connected app, or a more traditional application on a PC or Mac.

Certain aspects of the invention provide the following non-limiting embodiments:

Example 1

A method of creating an application, comprising: within a graphical user interface of an application developed by an original author, receiving an interaction with the application to make a modification to the application from a set of available modifications that the original author did not create for the application.

Example 2

The method according to example 1, further comprising: downloading the application from an app store.

Example 3

The method according to any of examples 1-2, wherein, in response to receiving the interaction with the application, performing the modification by requesting functionality from a developer program service.

Example 4

The method according to any of examples 1-3, wherein the interaction with the application comprises moving, showing, or hiding of input field elements to different positions within the graphical user interface of the application.

Example 5

The method according to any of examples 1-4, wherein the interaction with the application comprises moving, showing or hiding of fields of view.

Example 6

The method according to any of examples 1-5, wherein the interaction with the application comprises creating new views.

Example 7

The method according to any of examples 1-6, wherein the interaction with the application comprises adding or deleting data fields that store user values.

Example 8

The method according to any of examples 1-7, wherein the interaction with the application comprises adding or deleting fields to data schema.

Example 9

The method according to any of examples 1-8, wherein the interaction with the application comprises customizing logic for the application.

Example 10

The method according to example 9, wherein the logic comprises validation rules.

Example 11

The method according to examples 9 or 10, wherein the logic comprises work flow including associated system behaviors.

Example 12

The method according to any of examples 1-11, wherein the interaction with the application comprises customizing timing parameters.

Example 13

The method according to any of examples 1-12, wherein the interaction with the application comprises customizing notification rules of a work flow process.

Example 14

The method according to any of examples 1-13, wherein the interaction with the application comprises a visual modification to a graphical user interface of the application.

Example 15

The method according to example 14, wherein the visual modification is at least one of title, background color and background image.

Example 16

The method according to any of examples 1-15, wherein the set of modifications comprise at least one extensible feature available through communication with a function store or app store.

Example 17

The method according to any of examples 1-16, further comprising changing a setting of an option from a list of available options for the setting specified by the original author for the application.

Example 18

The method according to any of examples 1-17, further comprising: receiving an upgrade to the application after making the modification to the application, wherein the modification is automatically maintained after the upgrade.

Example 19

The method according to any of examples 1-18, further comprising sharing an instance of the application having the modification.

Example 20

The method according to any of examples 1-19, wherein changes to the application impact any other users of the application, any users of other instances of the application, and/or any users of templates cloned from the application.

Example 21

One or more computer readable storage media having stored therein instructions that, when executed by one or more processors, directs the one or more processors to perform a method comprising: receiving a template app; in response to receiving an indication to customize the template app from within the template app, entering customization mode initiating communication with a developer program service to determine a set of available modifications and enabling customizations to the template app from the set of available modifications not originally provided in the template app; receiving an indication of at least one modification to customize the template app; and saving an instance of the template app having the at least one modification.

Example 22

A media according to any of the preceding examples including example 21, wherein the method further comprises communicating with a function store or app store in response to receiving a request for an extensible feature from within the template app.

Example 23

A media according to any of the preceding examples including examples 21-22, wherein the method further comprises: in response to receiving an indication to use the instance of the template app, entering an app instance use mode and providing a user interface for a user to use the instance of the template app.

Example 24

A media according to any of the preceding examples including examples 21-23, wherein the template app is developed using a programming language comprising declarative attributes.

Example 25

A media according to example 24, wherein the developer program service provides functionality to the template app for changing the declarative attributes.

Example 26

A media according to any of the preceding examples including examples 21-25, wherein the method further comprises: in response to receiving a request to change a setting from specified settings options of the template app, changing the setting, wherein the specified settings options are originally provided in the template app.

Example 27

A system comprising: a first application instance stored on one or more computer readable storage media and comprising original application features, specified settings options, and a customization interface, wherein, when the first application instance is executed by one or more processors, the first application instance directs the one or more processors to: provide a user interface to the original application features for using the first application instance; and enter customization mode in response to receipt of an indication to initiate in-application customization, wherein during customization mode, the first application instance directs the one or more processors to: initiate communication between a developer platform service via the customization interface, provide a customizing user interface, and store a received modification to the first application instance as an app custom instance feature on the one or more computer readable storage media.

Example 28

A system according to any of the preceding examples including example 27, wherein the first application instance having the app custom instance feature is shareable as a second application instance.

Example 29

A system according to any of the preceding examples including example 28, wherein at least one app custom instance feature comprises a customization for a particular form factor device on which the second application instance is to be executed.

Example 30

A system according to any of the preceding examples including examples 27-29, wherein after the app custom instance feature is stored on the one or more computer readable storage media, when the first application instance is executed by the one or more processors, the first application instance directs the one or more processors to provide the first user interface to the app custom instance feature in response to specified use conditions for the first application instance.

Example 31

A system according to any of the preceding examples including examples 27-30, wherein when the first application instance is executed by the one or more processors, the first application instance further directs the one or more processors to: in response to receiving a request to change a setting from the specified settings options of the template app, change the setting, wherein the specified settings options are originally provided in the first application instance.

Example 32

A system according to any of the preceding examples including examples 27-31, wherein when the first application instance is executed by one or more processors, the first application instance directs the one or more processors to: in response to receiving an upgrade to at least one of the original application features, automatically apply any stored app custom instance features.

Example 33

A system comprising: a first application instance stored on one or more computer readable storage media that, when executed by one or more processors, directs the one or more processors to: provide a graphical user interface for using the first application instance; and in response to receiving, via the graphical user interface, an interaction to make a modification to the first application instance, communicate with a developer platform service to make the modification to the first application instance.

Example 34

A system according to any of the preceding examples including example 33, wherein the interaction to make a modification to the first application instance is received during run-time of the first application instance.

Example 35

A system according to any of the preceding examples including examples 33 or 34, wherein the interaction to make a modification to the first application instance is received during a customization mode of the first application instance.

Example 36

A system according to any of the preceding examples including examples 33 or 34, wherein the modification is to a particular element of the graphical user interface.

Example 37

A system according to any of the preceding examples including examples 33 or 34, wherein the modification is to a particular control or logic of the first application instance.

Figure 5B:
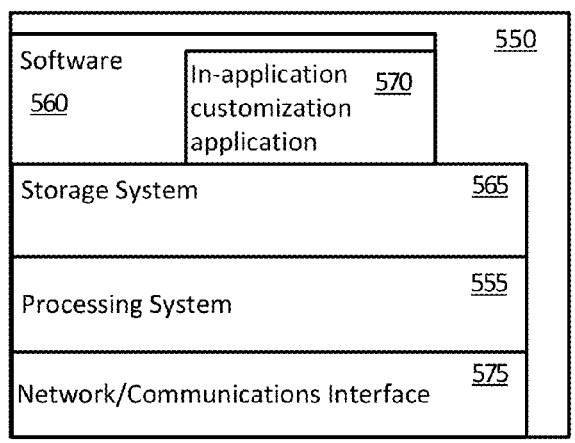

FIGS. 5A and 5B present block diagrams illustrating components of systems that may be used to implement the techniques described herein.

Referring to FIG. 5A, system 500 may represent a computing device such as, but not limited to, a personal computer, a tablet computer, a reader, a smart appliance (e.g., refrigerator), a mobile device, a personal digital assistant, a wearable computer, a smartphone, a laptop computer (notebook or netbook), a gaming device or console, a desktop computer, or a smart television. Accordingly, more or fewer elements described with respect to system 500 may be incorporated to implement a particular computing device.

System 500, for example, includes a processing system 505 of one or more processors to transform or manipulate data according to the instructions of software 510 stored on a storage system 515. Examples of processors of the processing system 505 include general purpose central processing units, application specific processors, and logic devices, as well as any other type of processing device, combinations, or variations thereof.

The software 510 can include an operating system and application programs such as an in-application customization application 520 and/or web browsing application 525. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 5A, can be thought of as additional, nested groupings within the operating system space, each containing an OS, application programs, and APIs.

Storage system 515 may comprise any computer readable storage media readable by the processing system 505 and capable of storing software 510 including the in-application customization application 520 and/or browsing application 525.

Storage system 515 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium a propagated signal or carrier wave.

In addition to storage media, in some implementations, storage system 515 may also include communication media over which software may be communicated internally or externally. Storage system 515 may be implemented as a single storage device but may also be implemented across multiple storage devices or sub-systems co-located or distributed relative to each other. Storage system 515 may include additional elements, such as a controller, capable of communicating with processor 505.

Software 510 may be implemented in program instructions and among other functions may, when executed by system 500 in general or processing system 505 in particular, direct system 500 or the one or more processors of processing system 505 to operate as described herein.

In general, software may, when loaded into processing system 505 and executed, transform computing system 500 overall from a general-purpose computing system into a special-purpose computing system customized to retrieve and process the information for using and customizing an in-application customization application as described herein for each implementation. Indeed, encoding software on storage system 515 may transform the physical structure of storage system 515. The specific transformation of the physical structure may depend on various factors in different implementations of this description. Examples of such factors may include, but are not limited to the technology used to implement the storage media of storage system 515 and whether the computer-storage media are characterized as primary or secondary storage.

The system can further include user interface system 530, which may include input/output (I/O) devices and components that enable communication between a user and the system 500. User interface system 530 can include input devices such as a mouse 531, track pad (not shown), keyboard 532, a touch device 533 for receiving a touch gesture from a user, a motion input device 534 for detecting non-touch gestures and other motions by a user, a microphone for detecting speech (not shown), and other types of input devices and their associated processing elements capable of receiving user input.

The user interface system 530 may also include output devices such as display screens 535, speakers (not shown), haptic devices for tactile feedback (not shown), and other types of output devices. In certain cases, the input and output devices may be combined in a single device, such as a touchscreen display which both depicts images and receives touch gesture input from the user. Visual output may be depicted on the display 535 in myriad ways, presenting graphical user interface elements, text, images, video, notifications, virtual buttons, virtual keyboards, or any other type of information capable of being depicted in visual form.

The user interface system 530 may also include user interface software and associated software (e.g., for graphics chips and input devices) executed by the OS in support of the various user input and output devices. The associated software assists the OS in communicating user interface hardware events to application programs using defined mechanisms. The user interface system 530 including user interface software may support a graphical user interface, a natural user interface, or any other type of user interface. For example, a user interface for the in-application customization application described herein may be presented through user interface system 530.

Communications interface 540 may include communications connections and devices that allow for communication with other computing systems over one or more communication networks (not shown). Examples of connections and devices that together allow for inter-system communication may include network interface cards, antennas, power amplifiers, radio frequency (RF) circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

It should be noted that many elements of system 500 may be included in a system-on-a-chip (SoC) device. These elements may include, but are not limited to, the processing system 505, a communications interface 540, and even elements of the storage system 515.

Computing system 500 is generally intended to represent a computing system with which software is deployed and executed in order to implement an application, component, or service for an in-application customization application as described herein. In some cases, aspects of computing system 500 may also represent a computing system on which software may be staged and from where software may be distributed, transported, downloaded, or otherwise provided to yet another computing system for deployment and execution, or yet additional distribution.

Certain aspects described herein may be carried out on a system such as shown in FIG. 5B. Referring to FIG. 5B, system 550 may be implemented within a single computing device or distributed across multiple computing devices or sub-systems that cooperate in executing program instructions. The system 550 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 550 can include a processing system 555, which may include one or more processors and/or other circuitry that retrieves and executes software 560 from storage system 565. Processing system 555 may be implemented within a single processing device but may also be distributed across multiple processing devices or sub-systems that cooperate in executing program instructions.

Examples of processing system 555 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

As with storage system 515, storage system 565 can include any computer readable storage media readable by processing system 555 and capable of storing software 560. Storage system 565 may be implemented as a single storage device but may also be implemented across multiple storage devices or sub-systems co-located or distributed relative to each other. Storage system 565 may include additional elements, such as a controller, capable of communicating with processing system 555.

Software 560 may be implemented in program instructions and among other functions may, when executed by system 550 in general or processing system 555 in particular, direct the system 550 or processing system 555 to operate as described herein for using and customizing an in-application customization application. Software 560 may provide program instructions that implement at least part of an in-application customization application 570.

Software 560 may also include additional processes, programs, or components, such as operating system software or other application software. Software 560 may also include firmware or some other form of machine-readable processing instructions executable by processing system 555.

System 550 may represent any computing system on which software 560 may be staged and from where software 560 may be distributed, transported, downloaded, or otherwise provided to yet another computing system for deployment and execution, or yet additional distribution.

In embodiments where the system 550 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 575 may be included, providing communication connections and devices that allow for communication between system 550 and other computing systems (not shown) over a communication network or collection of networks (not shown) or the air.

It should be noted that many elements of system 550 may be included in a system-on-a-chip (SoC) device. These elements may include, but are not limited to, the processing system 555, the communications interface 575, and even elements of the storage system 565.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A method carried out by at least one computer processor for creating an application, the method comprising:
    displaying, at a computing system, a graphical user interface of an application developed by an original author;
    receiving, via an input device of the computing system and while within the graphical user interface of the application, an interaction with the application to make a modification to the application from a set of available modifications that the original author did not create for the application; and
    performing, by the computing system, an in-application customization of the application to make the modification to the application.

2. The method of claim 1, wherein the modification comprises adding or deleting fields to data schema.

3. The method of claim 1, wherein the modification comprises customizing logic for the application.

4. The method of claim 1, wherein, performing the in-application customization of the application to make the modification to the application comprises requesting functionality from a developer program service.

5. The method of claim 1, wherein the set of modifications comprise at least one extensible feature available through communication with a function store or app store.

6. The method of claim 1, further comprising changing a setting of an option from a list of available options for the setting specified by the original author for the application.

7. The method of claim 1, further comprising:
    receiving an upgrade to the application after making the modification to the application; and
    upgrading the application according to the upgrade, wherein the modification is automatically maintained after the upgrade.

8. The method of claim 1, further comprising sharing an instance of the application having the modification.

9. One or more non-transitory computer readable storage media having stored therein instructions that, when executed by one or more processors, directs the one or more processors to perform a method comprising:
    receiving a template app;
    in response to receiving an indication to customize the template app, entering from within the template app, entering customization mode initiating communication with a developer program service to determine a set of available modifications and enabling customizations to the template app from the set of available modifications not originally provided in the template app;
    receiving an indication of at least one modification to customize the template app;
    performing the at least one modification to the template app as an in-application customization; and
    saving an instance of the template app having the at least one modification.

10. The media of claim 9, wherein the method further comprises communicating with a function store or app store in response to receiving a request for an extensible feature from within the template app.

11. The media of claim 9, wherein the method further comprises: in response to receiving an indication to use the instance of the template app, entering an app instance use mode and providing a user interface for a user to use the instance of the template app.

12. The media of claim 9, wherein the template app is developed using a programming language comprising declarative attributes.

13. The media of claim 12, wherein the developer program service provides functionality to the template app for changing the declarative attributes.

14. The media of claim 9, wherein the method further comprises:
    in response to receiving a request to change a setting from specified settings options of the template app, changing the setting, wherein the specified settings options are originally provided in the template app.

15. A system comprising:
    a first application instance stored on one or more computer readable storage media and comprising original application features, specified settings options, and a customization interface, wherein, when the first application instance is executed by one or more processors, the first application instance directs the one or more processors to:
        provide a user interface to the original application features for using the first application instance; and
        enter customization mode in response to receipt of an indication to initiate in-application customization, wherein during customization mode, the first application instance directs the one or more processors to:
            initiate communication with a developer platform service via the customization interface,
            provide a customizing user interface, and
            store a received modification to the first application instance as an app custom instance feature on the one or more computer readable storage media.

16. The system of claim 15, wherein the first application instance having the app custom instance feature is shareable as a second application instance.

17. The system of claim 16, wherein at least one app custom instance feature comprises a customization for a particular form factor device on which the second application instance is to be executed.

18. The system of claim 15, wherein after the app custom instance feature is stored on the one or more computer readable storage media, when the first application instance is executed by the one or more processors, the first application instance directs the one or more processors to provide a user interface for a user to use the first application interface having the app custom features.

19. The system of claim 15, wherein when the first application instance is executed by the one or more processors, the first application instance further directs the one or more processors to:

in response to receiving a request to change a setting from the specified settings options of the template app, change the setting, wherein the specified settings options are originally provided in the first application instance.

20. The system of claim 15, wherein when the first application instance is executed by one or more processors, the first application instance directs the one or more processors to:

in response to receiving an upgrade to at least one of the original application features, automatically apply any stored app custom instance features.

\* \* \* \* \*